(12) United States Patent
Allavarpu et al.

(10) Patent No.: US 7,779,390 B1
(45) Date of Patent: Aug. 17, 2010

(54) THREAD-SAFE REMOTE DEBUGGER

(75) Inventors: Sai V. Allavarpu, Pleasanton, CA (US);
Rajeev Angal, San Jose, CA (US); Tony T. Vuong, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1826 days.

(21) Appl. No.: 09/553,970

(22) Filed: Apr. 21, 2000

(51) Int. Cl.
*G06F 9/45* (2006.01)
(52) U.S. Cl. ....................................... 717/124
(58) Field of Classification Search ......... 717/124–135, 717/149
See application file for complete search history.

(56) References Cited

U.S. PATENT DOCUMENTS

| | | | | |
|---|---|---|---|---|
| 5,632,032 A | * | 5/1997 | Ault et al. ..................... | 709/100 |
| 5,953,530 A | * | 9/1999 | Rishi et al. ................... | 717/127 |
| 6,042,614 A | * | 3/2000 | Davidson et al. ............. | 717/116 |
| 6,202,199 B1 | * | 3/2001 | Wygodny et al. ............. | 717/125 |
| 6,209,018 B1 | * | 3/2001 | Ben-Shachar et al. ........ | 709/105 |
| 6,282,701 B1 | * | 8/2001 | Wygodny et al. ............. | 717/125 |
| 6,378,124 B1 | * | 4/2002 | Bates et al. ................... | 717/129 |
| 6,378,125 B1 | * | 4/2002 | Bates et al. ................... | 717/129 |
| 6,467,052 B1 | * | 10/2002 | Kaler et al. ................... | 714/39 |
| 6,530,079 B1 | * | 3/2003 | Choi et al. .................... | 717/158 |
| 6,539,501 B1 | * | 3/2003 | Edwards ....................... | 714/45 |

OTHER PUBLICATIONS

"What is CORBA?," Object Management Group, Inc., 1997-1999, 2 pages.
"CORBA Overview," Object Management Group, Inc., 1995, 13 pages.
"Overview of CORBA," Object Management Group, Inc., Jan. 19, 2000, 4 pages.
"Java, RMI and CORBA," Object Management Group, Inc., 1997-1999, 8 pages.
"A CORBA Primer," Technical Overview, A White Paper, Segue Software, 7 pages.

(Continued)

*Primary Examiner*—John Chavis
(74) *Attorney, Agent, or Firm*—Robert C. Kowert; Meyertons, Hood, Kivlin, Kowert & Goetzel, P.C.

(57) ABSTRACT

A thread-safe debugging system and method including a thread-safe debug service library and a thread-safe remote control library residing on at least one client computer system. The client and server libraries provide APIs which allow multi-threaded applications executing on the client computer system to take advantage of debug services in a thread-safe and dynamic manner. The remote control library provides third party applications the capability to initiate and manage the debug services on the client dynamically and remotely. The debug services may include providing debug output, listing the one or more debug objects in the multi-threaded application, listing the state of each debug object, turning on or off any debug object by name or pattern, directing the debug output to a remote location, allowing multiple remote diagnostic applications to view the debug output of the application, and logging statistical or performance information. The debug print function provides debug output for one or more threads of the multi-threaded application such that the debug output of each thread remains distinct from the debug output of the other threads. Thread safety may be ensured through the use of thread-safe mechanisms such as locks.

61 Claims, 6 Drawing Sheets

OTHER PUBLICATIONS

"Development Environment," Sun Microsystems, Inc., 1994-2000, 11 pages.

"Solstice Enterprise Manager 2.1 Reviewr's/Evaluator's Guide for Telecommunications Network Management," Sun Microsystems, Inc., 1998, pp. 1-45.

"Solstice Enterprise Manager 2.1: A Technical White Paper,", Sun Microsystems, Inc. Chapters 1-6, 68 pages, 1997.

"Solstive Enterprise Manager 3.0: Satisfying the Needs of Telecom Carriers & Service Providers," Sun Microsystems, Inc., 1994-2000, 3 pages.

"Joint Inter Domain Management (JIDM)," The Open Group, Jan. 10, 2000, 5 pages.

"Specification of Abstract Syntax Notation One (ASN.1)," International Telecommunication Union, ITU-T Recommendation X.208, 1988 and 1993, pp. 1-72.

"Specification of Basic Encoding Rules for Abstract Syntax Notation One (ASN.1)," International Telecommunication Union, ITU-T Recommendation X.209, 1988 and 1993, pp. 1-23.

"Inter-Domain Management: Specification Translation,", The Open Group, 1997, 281 pages.

"CORBA-Based Telecommunication Network Management Systems," Object Management Group, Inc., May 1996, pp. 1-29.

"Intelligent Networking with CORBA, *A White Paper*," Nortel, et al., Draft 2.0, Oct. 31, 1996, pp. 1-7.

"Inter-Domain Management Between CORBA and SNMP: Web-Based Management-CORBA/SNMP Gateway Approach," Subrata Mazumdar, Lucent Technologies, 1996, pp. 1-16.

"Mapping of Common Management Information Services to CORBA Objects Services Specification," Subrata Mazumdar, Lucent Technologies, Mar. 10, 1997, pp. 1-68.

"A Discussion of the Object Management Architecture," Object Management Group, Inc., Jan. 1997, pp. 1-1 to 1-6, 2-1 to 2-6, 3-1 to 3-8, 4-1 to 4-12, A-1 to A-8.

"CMIS/C++: Application Programming Interface," Network Management Forum, Issue 1.0, Feb. 1998, pp. 1-226.

"JIDM Interaction Translation," Final Submission to OMG's CORBA/TMN Interworking RFP, Object Management Group, Inc. Edition 4.3, OMG Document Number: telecom/98-10-10, Oct. 1998, 273 pages.

* cited by examiner

THREAD-SAFE REMOTE DEBUGGER

BACKGROUND OF THE INVENTION

1. Field of the Invention

The present invention relates generally to computer software. More particularly, the present invention relates to software for debugging computer programs.

2. Description of the Relevant Art

The field of network management involves the management of networked devices, often remotely. A computer network is a linked group of two or more computers. Generally, networks may be classified as Local-Area Networks (LANs) or Wide-Area Networks (WANs). In a LAN, the computers or devices are typically connected together within a "local" area such as a home, office, or group of offices. In a WAN, the computers or devices are typically separated by a greater distance and are often connected via telephone/communication lines, radio waves, or other suitable means of connection.

Networks are usually classified using three properties: topology, protocol, and architecture. Topology specifies the geometric arrangement of the network. Common topologies are bus, ring, and star configurations. A network's protocol specifies a common set of rules and/or signals, such as Ethernet or Token Ring, which the networked devices use to communicate with each other. A network's architecture typically specifies one of the two major types of network architecture: peer-to-peer or client/server. In a peer-to-peer networking configuration, there is no server, and computers simply connect with each other in a workgroup to share files, printers, services, and Internet access. Client/server networks often include a domain controller to which all of the networked computers log on. This server may provide various services such as centrally routed Internet access, e-mail, file sharing, printer access, and security services.

Many types of devices may be managed over a network, such as printers, scanners, phone systems, copiers, and many other devices and appliances configured for network operation. Typically, such devices are managed via requests and events. A request is a message sent to a managed object. A request may be sent by a manager application to a managed object to query the object about a particular parameter associated with the object. A request may also be sent to a managed object to modify a parameter of the object. Alternately, an event is a message originating with a managed object. Events may be sent by managed objects to signal some change of state of the managed object, or to communicate information about the managed object. Managing such devices tends to require that the data types of each device's control parameters and signals be well defined. For example, a networked printer might have a Boolean status parameter which indicates whether the device is currently on or off and a control parameter which turns the printer on or off. A manager application may send a request to determine the on/off status of the printer. Then, once the status is determined, say, to be off, a subsequent request may be sent to modify the control parameter to turn the printer on. The printer may also be capable of generating an alert signal indicating, for example, that the toner level is low. In this case, an event communicating that fact may be sent by the managed object (the printer) to the appropriate manager application.

The network management software should be able to read and write these data correctly in order to manage the device. To do this, information about the data is required. Such information is referred to as metadata, or "data about data." Metadata may typically describe what type of data (string, integer, Boolean, structure) an object has and how the data are formatted. Metadata is essential for understanding information related to managed devices, as well as information stored in data warehouses. Typically, network management software manages a given device by storing and manipulating a representation of its pertinent data as a software object, herein referred to as a "managed object." This object is the virtual representation of the device on the network.

FIG. 1a illustrates an example of typical elements of a telecommunications network. The telecommunications world is characterized by devices such as cell phones, cell phone towers and other kinds of towers 156, phone systems 151, faxes 152, routers 153, switches 154, satellite dishes 155, etc., which may be interconnected via networks 108a. The management of such a large number of devices results in a huge volume of event/request traffic, which must itself be managed. In response to the network management needs of this technology sector, a conceptual framework for telecom network management called TeleManagement Network (TMN) was developed by the Telecom Management Forum (TMF). TMN defines the relationship between basic network building blocks, such as network elements, different network protocols, and operations systems, in terms of standard interfaces. Generally, a TMN system includes Agent hardware 150, Manager software 170, and Agent software 160. The Agent hardware 150 includes the managed devices such as those shown in FIG. 1a. The Manager software 170 includes any application used to manage a networked device. These manager applications, or client applications, may be installed and executed on one or more client computer systems 171a, 171b, . . . , 171n. The Agent software 160 includes the software interface between the Manager software 170 (for communications via network 108b) and the Agent hardware 150 (for communications via network 108a). The Agent software 160 may be installed and executed on one or more server computer systems 161a, 161b, . . . , 161n. In some instances, the Agent software 160 and Manager software 170 may be installed and executed on the same computer system. The Agent software 160 may also reside, in whole or part, on the Agent hardware 150 itself.

One TMN approach to managing objects over a network is the Simple Network Management Protocol (SNMP), a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters. The metadata used by SNMP to describe managed object data variables includes the variable title, the data type of the variable (e.g. integer, string), whether the variable is read-only or read-write, and the value of the variable. SNMP works over the TCP/IP (Transport Control Protocol/Internet Protocol) communication stack. SNMP also uses UDP over IP, and also may support TCP over IP. It is widely held, however, that SNMP was developed as a simple "quick fix" and was never intended to be a permanent solution to network management. Consequently, one problem with SNMP is that the information it specifies is neither detailed nor well-organized enough to adequately serve the expanding needs of modern networking.

Another example of a TMN network management protocol is the Common Management Information Protocol (CMIP). In the U.S. the CMIP protocol is primarily run over TCP/IP, while in Europe it is generally run over the OSI (Open Systems Interconnection) communication stack and was designed to replace SNMP and address SNMP's shortcomings by providing a larger, more detailed network manager. Its basic design is similar to SNMP: Management requests, management responses, and notifications are employed to monitor a network. These correspond to SNMP's PDUs. CMIP, however, contains eleven types of messages, compared to SNMP's five types of PDUs.

In CMIP, variables are seen as complex and sophisticated data structures with many attributes. These include: variable attributes, which represent the variable's characteristics (e.g., its data type, whether it is writable); variable behaviors, or the actions of that variable that can be triggered; and notifications, or event reports generated by the variable whenever a specified event occurs (e.g., a terminal shutdown would cause a variable notification event).

As a comparison, SNMP only employs variable attributes and notifications, but not variable behaviors. One of the strongest features of the CMIP protocol is that its variables not only relay information to and from the terminal (as in SNMP), but they can also be used to perform tasks that would be impossible under SNMP. For instance, if a terminal on a network cannot reach its fileserver for a predetermined number of tries, then CMIP can notify the appropriate personnel of the event. With SNMP, a user would need to explicitly keep track of the number of unsuccessful attempts to reach the fileserver. CMIP thus results in a more efficient network management system, as less work is required by a user to keep updated on the status of the network.

A significant disadvantage of the CMIP protocol is that it requires more system resources than SNMP, often by a factor of ten. Thus, any move to CMIP from SNMP requires a dramatic upgrade in network resources. Another disadvantage with CMIP is that it is very difficult to program; the variable metadata includes so many different components that few programmers are generally able to use the variables to their full potential.

Both of the above protocols have been implemented in a number of programming languages, such as C, C++, and Java™. However, network management software which takes advantage of SNMP or CMIP must be written specifically for the language of the protocol implementation. In other words, SNMP-based and CMIP-based network management software is dependent upon a particular programming language and protocol implementation.

GDMO (Guidelines for Definition of Managed Objects) is a standard for defining objects in a network in a consistent way. With a consistent "language" for describing such objects as workstations, LAN servers, and switches, programs can be written to control or sense the status of network elements throughout a network. GDMO prescribes how a network product manufacturer must describe the product formally so that others can write programs that recognize and deal with the product. Using GDMO with ASN1, descriptions may be made of the class or classes of the object, how the object behaves, its attributes, and classes that it may inherit.

GDMO is part of the CMIP and also the guideline for defining network objects under TMN. The object definitions created using GDMO and related tools form a Management Information Base (MIB). GDMO uses Abstract Syntax Notation One (ASN1) as the rules for syntax and attribute encoding when defining the objects. Abstract Syntax Notation One is a language that defines the way data is sent across dissimilar communication systems. ASN1 ensures that the data received is the same as the data transmitted by providing a common syntax for specifying application layer (e.g., program-to-program communications) protocols. Each communications system contains a similar ASN1 encoding/decoding scheme written in the language used on that particular system. When one system wants to send data to another, the first system encodes the data into ASN1, sends the data, and the second system receives and decodes the data using the decoder written in the language used on that system.

In response to the difficulties presented by SNMP and CMIP, the Object Management Group (OMG) and Joint Inter-Domain Management (JIDM) have defined Interface Definition Language (IDL) for network management, which is used to access object instance data and may be used across a plurality of programming languages and across a plurality of platforms. JIDM IDL allows programmers to write only one set of interfaces for a particular object across multiple programming languages, rather than having to write a new set of interfaces for each programming language.

A middleware standard used extensively in network management is the Common Object Request Broker Architecture (CORBA), which is provided by the Object Management Group (OMG). CORBA specifies a system that provides interoperability between objects in a heterogeneous, distributed environment and in a way transparent to the programmer. Its design is based on the OMG Object Model, which defines common object semantics for specifying the externally visible characteristics of objects in a standard and implementation-independent way. In this model, clients request services from objects (which will also be called servers) through a well-defined interface. This interface is specified in the OMG Interface Definition Language (IDL).

In CORBA, a client accesses an object by issuing a request to the object. The request is an event, and it carries information including an operation, the object reference of the service provider, and actual parameters, if any. The object reference is an object name that reliably defines an object.

A central component of CORBA is the Object Request Broker (ORB). The ORB encompasses the communication infrastructure necessary to identify and locate objects, handle connection management, and deliver data. In general, the ORB is not required to be a single component; it is simply defined by its interfaces. The basic functionality provided by the ORB includes passing the requests from clients to the object implementations on which they are invoked. The ORB acts as the middleware between clients and servers. In the CORBA model, a client can request a service without knowing anything about what servers are attached to the network. The various ORBs receive the requests, forward them to the appropriate servers, and then hand the results back to the client.

In CORBA, a client first looks up the object (server) it wants to communicate with. The ORB, as a result of the lookup operation, returns an object reference (a handle) of the server to the client. The client then uses the object reference to invoke operations on the object as a function call in the chosen programming language. The ORB intercepts the client request, collects the information about the operation and the request parameter values, encodes it in IIOP, and sends it to the object (server). The ORB on the object side (server) translates the request into a programming language specific function call on the server object. The server object then processes the request and returns a response, if any. The ORB intercepts the response, encodes the response and its parameters into IIOP, and sends it to the client. The ORB on the client side then returns the response to the client as the return value of the function call originally made as part of issuing the request.

In many cases, CORBA gateways to specific services may be developed to manage specific network traffic, such as requests and events. Typically, these gateways are designed as single-threaded programs. However, increasingly, the benefits of multi-threading are desired for applications and server programs related to network management.

Multi-Threaded Applications

A thread is an encapsulation of the flow of control in a program. Most programs are single-threaded; they only execute one path through their code at a time. Multi-threaded programs may have several threads running through different code paths simultaneously. Multi-threading typically means sharing a single CPU between multiple threads in a way designed to minimize the time required to switch threads. This is accomplished by sharing as much as possible of the program execution environment between the different threads so that very little state needs to be saved and restored when changing threads. Furthermore, if a computer has multiple CPUs and a program has multiple threads, multiple threads of the program may be run on separate CPUs concurrently. Thus multi-threading allows applications to scale with the number of CPUs, as well.

Multi-threading differs from multi-tasking in that threads share more of their environment with each other than do tasks under multi-tasking. Threads may be distinguished only by the value of their program counters and stack pointers while sharing a single address space and set of global variables. Often, there is very little protection of one thread from another, in contrast to multi-tasking. Multi-threading can thus be used for very fine-grained multi-tasking at the level of a few instructions and therefore can hide latency by keeping the processor busy after one thread issues a long-latency instruction on which subsequent instructions in that thread depend.

In a typical process in which multiple threads are used, zero or more threads may actually be running at any one time. This depends on the number of CPUs used by the computer on which the process is running, and also on how the threads system is implemented. A machine with n CPUs may run no more than n threads in parallel, but it may give the appearance of running many more than n threads simultaneously by sharing the CPUs among threads.

A context switch between two threads in a single process is considerably more efficient than a context switch between two processes. In addition, the fact that all data except for stack and registers are shared between threads makes them a natural vehicle for expressing tasks that may be broken down into subtasks that may be run cooperatively. Global variables and resources are shared between threads within the same process. Each thread has its own stack.

In many ways, the use of threads provides benefits over the use of processes in that threads are more efficient to create, switching between threads in the same process is much more efficient than switching processes, and there is easier sharing of resources between threads. Context switching among threads is very efficient in that there are no page or segment table manipulations, no flushing of the associative memory cache (when switching among threads sharing an address space), and no copying of data when exchanging messages among threads of the same address space.

As used herein, "thread-safe" refers to the property that a program may safely use or be used by multiple threads to avoid, for example, data inconsistencies, access collisions, coherency problems, and other errors. When multiple threads share resources, access to the resources should be synchronized to ensure thread-safety. One way this may be accomplished is through the use of a mutual exclusion (mutex) object. A mutual exclusion object allows multiple threads to synchronize access to shared resources. A mutex has two states: locked and unlocked. Once a mutex has been locked by a thread, other threads attempting to lock it will be blocked. When the locking thread unlocks (releases) the mutex, one of the blocked threads may acquire (lock) it and proceed. When managed object events and responses are delivered to a client manager application using multiple threads, synchronization and serialization of the event and response deliveries may become problematic in that the use of different threads to deliver sequential events may introduce chronological inconsistencies due to differing thread execution times. In other words, if a first event is sent using a first thread, and a subsequent second event is sent using a second thread, then depending upon the execution times of the two threads, the second event may actually be delivered prior to the first event.

TMN applications, like most other software applications, require testing and debugging. However, typical debugging methods require that the application be stopped to reconfigure for debugging, such as by a command-line switch. This is often unacceptable for applications which are required to be operable twenty-four hours per day, seven days per week. Generally, debuggers are required to reside on the same computer as the running application. This restriction may be problematic for applications run in the field where software expertise may not be locally available. Also, debuggers are generally sold as components of a development toolkit under a development license, but most field applications are used under a deployment/runtime license, and so debugging capabilities may not be available. Finally, debuggers which are not designed specifically for multi-threaded applications may not be able to handle debug output from multiple threads concurrently without mangling the output, i.e., the debug output messages from the multiple threads may not remain distinct.

Therefore, improved systems and methods for debugging multi-threaded applications are desired.

SUMMARY OF THE INVENTION

The problems outlined above are in large part solved by various embodiments of a thread-safe debugging system and method as disclosed herein. The system may include a thread-safe client debug service and a thread-safe dynamic remote control debug service, referred to as a remote control service, both of which reside on a client computer system with the client application to be debugged. The debug service and the remote control service may provide application programming interfaces (APIs) which allow multi-threaded applications executing on the client computer system to take advantage of debug services in a thread-safe and dynamic manner. One or more debug objects may be associated with one or more components of the multi-threaded application. Each component may be responsible for a particular task or set of tasks, such as database access, interaction with users, interaction with a CORBA bus, etc. The debug services may include providing debug output, listing the debug objects in the multi-threaded application, listing the state of each debug object, turning on or off any debug object by name or pattern, directing the debug output to a remote location, allowing multiple remote diagnostic applications to view the debug output of the application, and logging statistical or performance information.

The remote control service may provide a network protocol interface through which one may initiate and manage the debug services on the client computer system after initiation of the multi-threaded application. In other words, the debug services may be remotely and dynamically controlled. In contrast to previous solutions which require a command-line switch to be specified to turn debug services on or off when launching the program that is sought to be debugged, with the system and method described herein, debug services may be switched on or off after program execution has begun. This capability is especially important for applications such as network management applications that are expected to be available at all times and without interruption in service. Furthermore, in one embodiment, debug services may be switched on or off for a program running on the client computer system by issuing commands (e.g., control requests) from a third party application over a network.

In one embodiment, the remote control service may be operable to allow third party applications to switch the debug services on and off for each of the corresponding components of the multi-threaded application by referencing each of the corresponding debug objects, such as by specifying the name of each desired debug object. The remote control service may also allow one to switch the debug services on and off for a set of the corresponding components of the multi-threaded application by specifying a pattern to select a set of the debug objects by name, such as with the use of character wild cards. This capability allows one to specify groups of debug objects to receive particular debug commands.

The debug services may include a thread-safe debug print function. In one embodiment, the debug print function is operable on the client computer system independently of the remote control service. The debug print function may provide debug output for one or more threads of the multi-threaded application such that the debug output of each thread remains distinct from the debug output of the other threads. In other words, debug output from different threads may be presented such that the output is not interleaved or otherwise garbled. In one embodiment, the debug output of each of the one or more threads executing the multi-threaded application may be directed to an output target, such as a standard output terminal or a file. In one embodiment, the debug output may be directed to one or more recipient computer systems coupled to the client computer system. For example, the debug output may be directed to a diagnostic tool on a recipient computer system for analysis of problems encountered during the execution and debugging of the multi-threaded application.

Thread safety may be ensured throughout the debugging system through the use of thread-safe mechanisms such as locks. In one embodiment, for example, the debug output of each thread may be kept distinct by associating a mutex (mutual exclusion) lock with each output target. When a thread in the application invokes the print function to send the debug output to an output target, it may first acquire the associated mutex lock, then send the debug information to the output target, and finally, release the mutex lock. Since only one thread may acquire the mutex lock at a given time, other threads trying to acquire the mutex lock to send debug information to the output target must wait until that lock is released by the current thread owning the lock.

In one embodiment, the debug object class may be i18n-enabled to provide for debug output in a plurality of languages. The term "i18n" refers to internationalization, which is the process of designing an application so that it can be adapted to different languages and regions without requiring engineering changes.

BRIEF DESCRIPTION OF THE DRAWINGS

Other objects and advantages of the invention will become apparent upon reading the following detailed description and upon reference to the accompanying drawings in which.

Figure 1A:
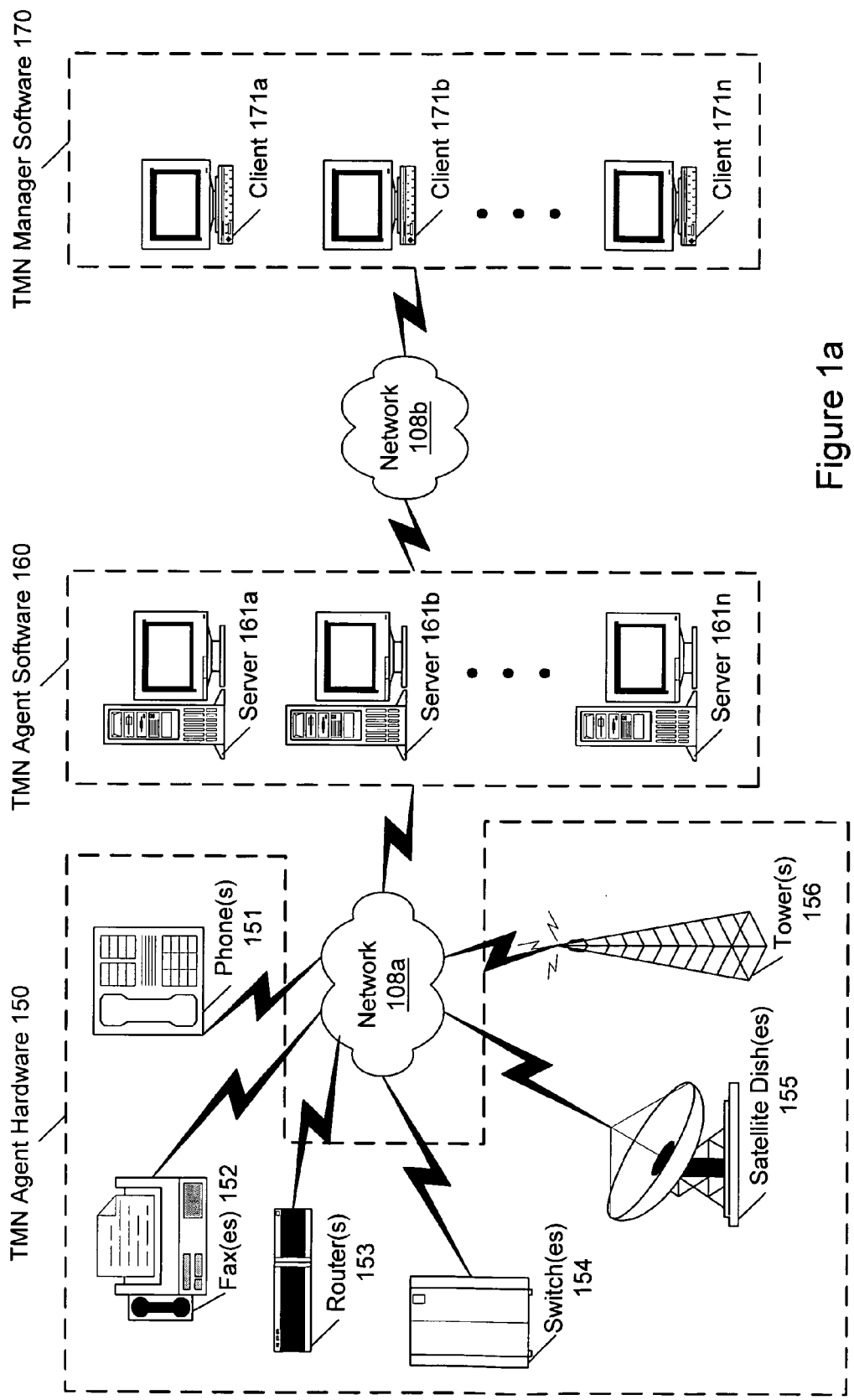
FIG. 1a illustrates an example of typical elements of a telecommunications network.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1b

A Typical Computer System

Figure 1B:
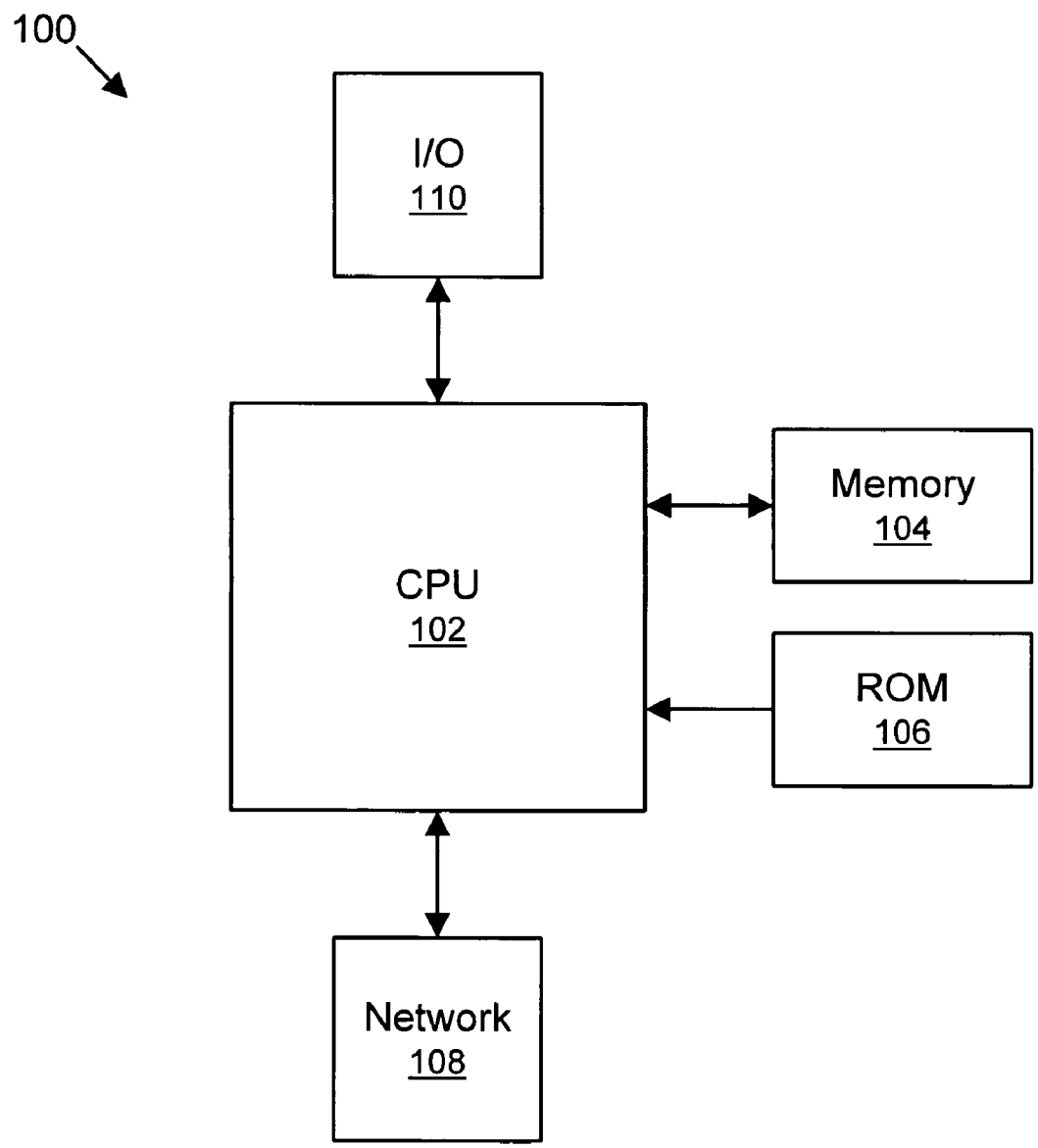
FIG. 1b is an illustration of a typical computer system architecture which is suitable for implementing various embodiments.

Turning now to the drawings, FIG. 1b is an illustration of a typical, general-purpose computer system 100 which is suitable for implementing various embodiments of the system and method for network management as disclosed herein. The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory," "memory medium," and "storage medium" may include an installation medium, e.g., a CD-ROM or floppy disk, a computer system memory such as DRAM, SRAM, EDO RAM, etc., or a non-volatile memory such as a magnetic media, e.g., a hard drive or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1b, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for network management as disclosed herein may therefore be implemented on a plurality of heterogeneous or homogeneous networked computer systems 100 through one or more networks 108. The CPU 102 may acquire instructions and/or data for implementing system and method for network management as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for network management as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

FIG. 2

A Computer Network

Figure 2:
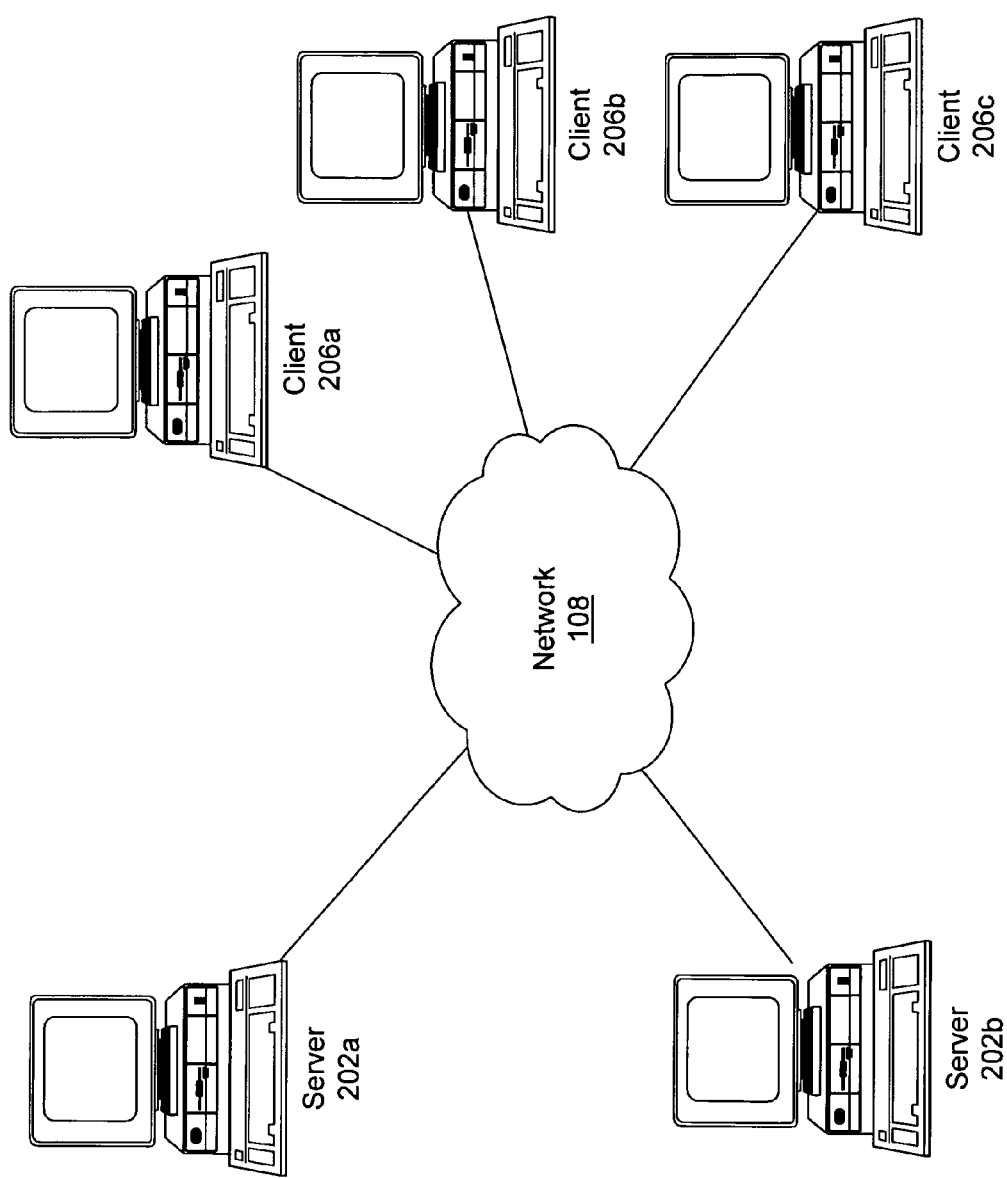
FIG. 2 is an illustration of a computer network according to one embodiment.

FIG. 2 illustrates a computer network which is suitable for implementing various embodiments. As can be seen in FIG. 2, client machines 206 are connected to a network 108. Also connected to the network 108 are server machines 202. The numbers of machines shown are for illustration purposes only; the actual number of machines may of course be greater or lesser. Note that for simplicity, a group of similar components (e.g., 206a, 206b, and 206c) may be referred to by a single number (e.g., 206). The present invention may be used with any of various types of local-area networks (LANS) or wide-area networks (WANs), such as the Internet, which connect computers and networks of computers together, thereby providing the connectivity between clients 206 and servers 202. In one embodiment, the network 108 may use standards such as TCP/IP, HTTP, HTML or XML.

FIG. 3

A Thread-Safe Debugging System

Figure 3:
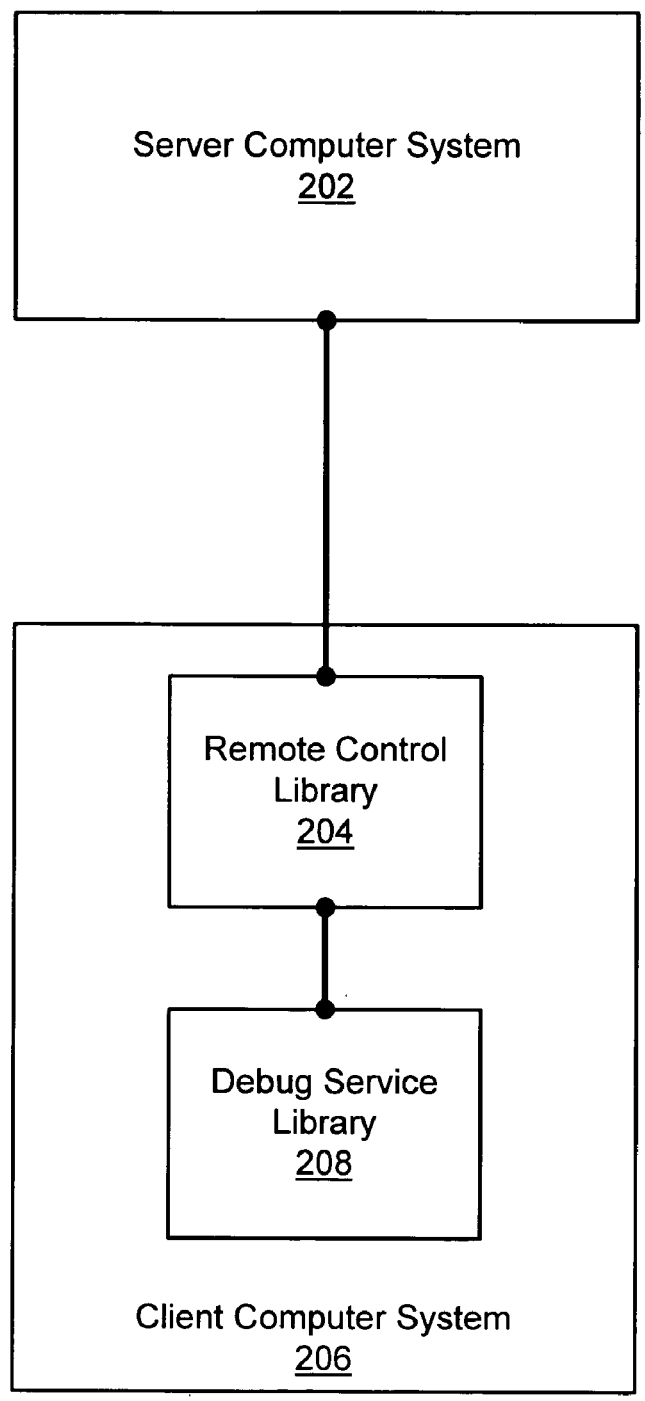
FIG. 3 is a block diagram of a thread-safe debugging system according to one embodiment.

FIG. 3 is a block diagram of a thread-safe debugging system according to one embodiment. As shown in FIG. 3, a thread-safe debug service library 208 resides on client computer system 206. A thread-safe remote control library 204 may also reside on the client computer system 206. The client computer system 206 may be communicatively coupled to a server computer system 202, such as through a network 108.

In one embodiment, the debug service library 208 may provide debug services to debug a multi-threaded application which is executable on the client computer system 206. In one embodiment, the application is written in C++ or another suitable programming language. In one embodiment, the debug service has a C++ API. The various debug services are discussed in greater detail below.

An application using only the debug service 208 cannot be remotely and dynamically controlled or diagnosed. After such an application has already started, there is no standard way to turn on/off the debugging. This can only be done statically at the startup time by supplying the turn on/off parameters, which then are used by the application to internally enable/disable the debugging.

Note that an application using the remote control service must also use the debug service. In other words, use of the debug service is a prerequisite to use the remote control service. An application using the remote control service allows third-party applications to issue text commands over a network connection to the remote control service. Such text commands accomplish the task of dynamically and remotely turning on/off the debugging, statistical or performance logging, listing debug objects, or other debug services.

The thread-safe remote control library 204 may provide a network protocol interface (text commands sent over the network) through which a remote third party application may initiate and manage the debug services on the client computer system 206 after initiation of the multi-threaded application. In other words, the debug services may be remotely and dynamically controlled. In contrast to previous solutions which require a command-line switch to be specified to turn debug services on or off when launching the program that is sought to be debugged, with the system and method described herein, debug services may be switched on or off after program execution has begun. Furthermore, in one embodiment, debug services may be switched on or off for a program running on the client computer system 206 by issuing commands from the server computer system 202.

The debug services may include a thread-safe debug print function. In one embodiment, the debug print function is operable on the client computer system 206 independently of the remote control service 204. The debug print function may provide debug output for one or more threads of the multi-threaded application such that the debug output of each thread remains distinct from the debug output of the other threads. In other words, debug output from different threads may be presented such that the output is not interleaved or otherwise garbled. In one embodiment, the debug output of each of the one or more threads executing the multi-threaded application may be directed to an output target, such as a standard output terminal or a file.

Thread safety may be ensured throughout the debugging system through the use of thread-safe mechanisms such as locks. In one embodiment, for example, the debug output of each thread may be kept distinct by associating a mutex (mutual exclusion) lock with each output target. When a thread in the application invokes the print function to send the debug output to an output target, it may first acquire the associated mutex lock, then send the debug information to the output target, and finally, release the mutex lock. Since only one thread may acquire the mutex lock at a given time, other threads trying to acquire the mutex lock to send debug information to the output target must wait until that lock is released by the current thread owning the lock.

FIG. 4

A Thread-Safe Debugging System Including Debug Objects

Figure 4:
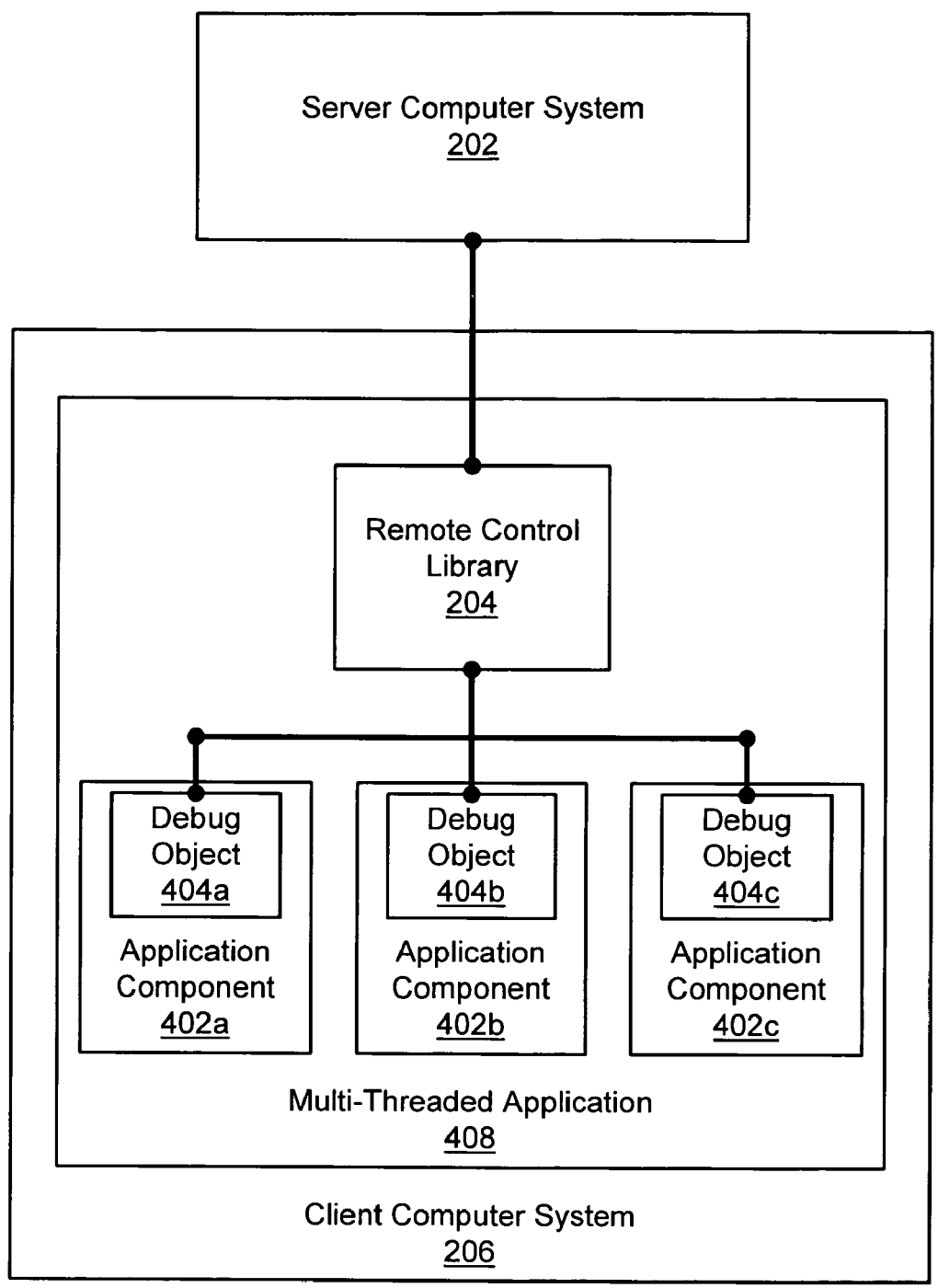
FIG. 4 is a block diagram of a debugging system including debug objects according to one embodiment.

FIG. 4 is a block diagram of a thread-safe debugging system including a plurality of debug objects according to one embodiment. The debug service library 208 referenced in FIG. 3 may provide one or more debug objects 404, each of which may be associated with a component 402 of a multi-threaded application 408 which is executable on the client computer system 206. In one embodiment, the debug objects 404 may be created by instantiating them from a debug object class included in the debug service library 208. In one embodiment, the application components 402 may comprise objects or combinations of objects as designated by the application developer. Each component may be responsible for a particular task or set of tasks, such as database access, interaction with users, interaction with a CORBA bus, etc. An application may also use only one debug object.

Each of the debug objects 404 may be operable to provide debug services for the corresponding component 402 of the multi-threaded application 408. As discussed below, the debug services may include listing the debug objects in the application, listing the state of each debug object, turning on or off any debug object by name or pattern, directing the debug output to a remote location, allowing multiple remote diagnostic applications to view the debug output of the application, and logging statistical or performance information. As FIG. 4 illustrates, the debug service library 208 and the remote control library 204 may both reside on the client computer system 206, which may be communicatively coupled to the server computer system 202. The remote control library 204 may provide an interface through which the client-side debug services may be managed remotely and dynamically.

In one embodiment, the remote control service provided by the remote control library may allow a third party application to switch the debug services on and off for each of the corresponding components of the multi-threaded application 408 by referencing each of the corresponding debug objects 404, such as by specifying the name of each desired debug object 404. The remote control service may also allow third party applications to switch the debug services on and off for a set of the corresponding components of the multi-threaded application 408 by specifying a pattern to select a set of the debug objects 404 by name, such as with the use of character wild cards. A wild card is a special symbol that stands for one or more characters. Many operating systems and applications support wildcards for identifying files and directories. This enables one to select multiple files with a single specification. For example, the asterisk (*) is a wild card that stands for any combination of letters. The file specification m* refers to all files that begin with m. Similarly, the specification m*.doc refers to all files that start with m and end with .doc. This capability allows the third party applications to specify groups of debug objects 404 to receive particular debug commands.

In one embodiment, the remote control service may also be operable to allow third party applications to list all the debug objects 404 in the multi-threaded application and to list a state of each of the debug objects 404. For example, in various embodiments the state may include information such as the destination of debug output generated by the debug object 404, whether the debug object is "on" or "off," and information regarding the execution of the corresponding component of the application 408. In other words, the state may include the values of attributes of a debug object 404. The remote control service may be further operable to switch the debug services on and off after initiation of the multi-threaded application 408. This is in contrast to the requirement of many debuggers to be switched on or off at the startup of the application to be debugged, such as by command-line switches. In other words, the remote control service may allow for dynamic configuration of the debug services after the application 408 begins executing. This capability is especially important for applications such as network management applications that are expected to be available at all times and without interruption in service.

The debug services may provide an application programming interface (API) to be used by applications 408. The application 408 may call an initialization function of the debug API to initialize a remote control service. The remote control service may then begin listening for control requests on a port number specified as an argument of the function call. Control requests may control a given debug object 404 or set of debug objects 404. For example, a debug object 404 may be enabled or disabled (i.e., turned on or off) via a control request from a third party application running on the server computer system 202. When a remote control service receives a control request, it parses the request and determines which of the debug objects 404 are the target of the request. The third party application may maintain an internal list of debug objects 404 in the application 408. After finding the target debug object or objects 404 in the list, the third party application may apply the control request to them.

In one embodiment, the debug services may include profiling the execution of the multi-threaded application 408, tracing program execution through the multi-threaded application 408, and collecting run-time statistics on the execution of the multi-threaded application 408. The debug services may further include logging statistical and performance information on the execution of the multi-threaded application 408.

FIG. 5

A Thread-Safe Debugging System

Figure 5:
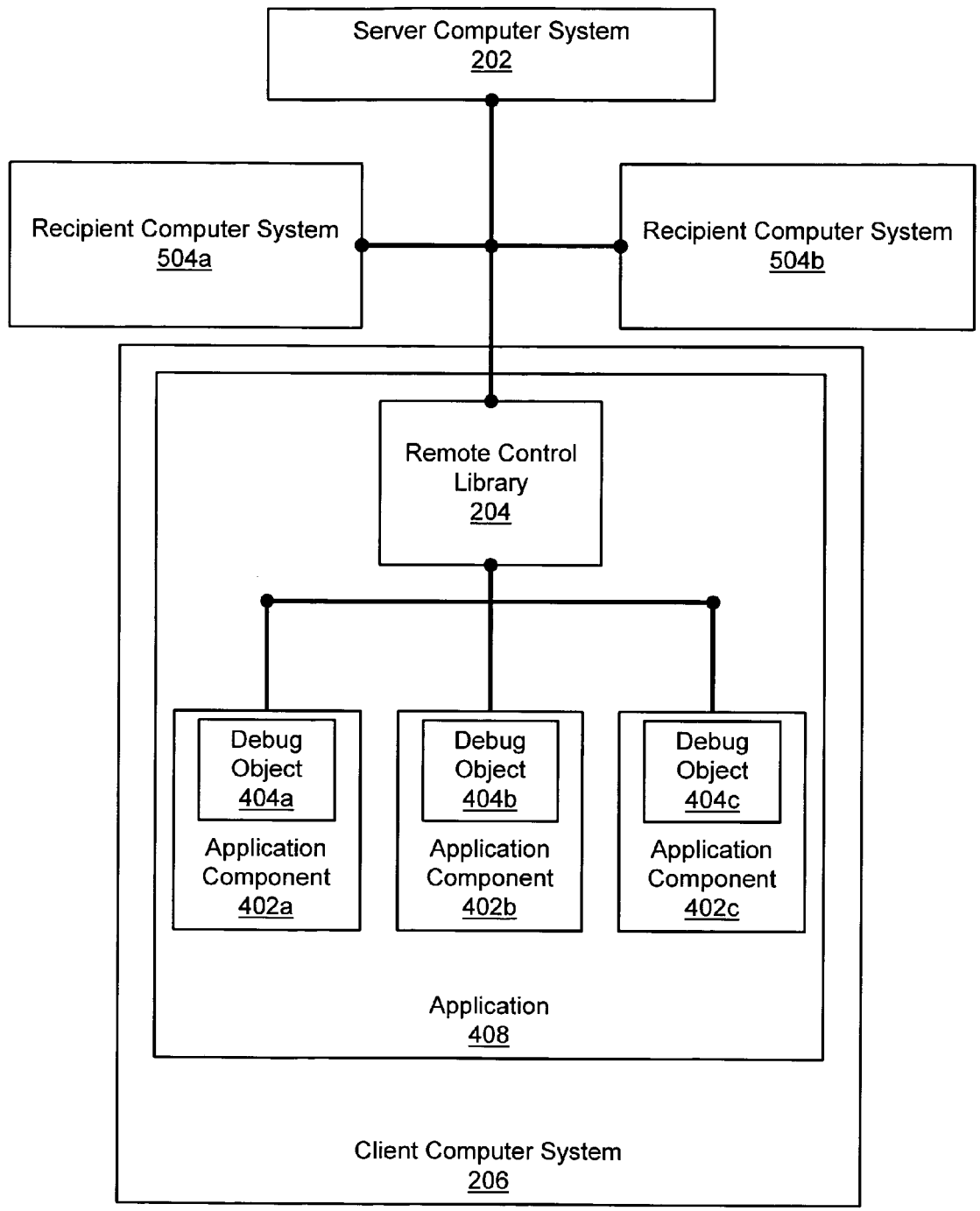
FIG. 5 is a block diagram of a thread-safe debugging system including recipient computer systems according to one embodiment.

FIG. 5 is a block diagram of a thread-safe debugging system including recipient computer systems according to one embodiment. As shown in FIG. 5, the client-side computer system 206 is communicatively coupled to the server computer system 202. Also shown in FIG. 5 are recipient computer systems 504, which are coupled to the client 206 and server 202 computer systems, such as through a computer network. As described above, the multi-threaded application 408 is resident on the client computer system 206, and comprises application components 402. Associated with each application component 402 is a debug object 404, which is provided by the debug service library 208. Each debug object 404 may provide client-side debug services for the corresponding application component 402, as discussed above in reference to FIG. 4. Also resident on the client computer system 206 is the remote control library 204. Third party applications residing on the server computer system 202 may send control requests to the client application 408 through the remote control library 204 directing debug output of any or all of the application component debug objects 404 to one or more output targets.

In one embodiment, the output target for debug output may include one or more computer systems coupled to the client computer system, such as the recipient computer systems 504. The output target may include one or more remote diagnostic tools running on the recipient computer systems 504. For example, the debug output may be directed to a diagnostic tool on a recipient computer system 504 for analysis of problems encountered during the execution and debugging of the application 408.

In one embodiment, the debug object class may be i18n-enabled to provide for debug output in a plurality of languages. The term "i18n" refers to internationalization, which is the process of designing an application so that it can be adapted to different languages and regions without requiring engineering changes. The term internationalization is often abbreviated as i18n, because in the English language there are 18 letters between the first and last letters of the word "internationalization."

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A thread-safe debugging system, comprising:
a thread-safe debug service which is executable on a client computer system to provide debug services to debug a multi-threaded application which is executable on the client computer system; and
a thread-safe remote control service which is executable on the client computer system to receive control requests from an external source to initiate and manage the debug services on the client computer system after initiation of the multi-threaded application, wherein the external source comprises a remote computer system external to the client computer system.

2. The thread-safe debugging system of claim 1, wherein the debug client comprises a thread-safe debug print function which is operable independently of the remote control service, wherein the thread-safe debug print function is operable to provide debug output for one or more threads of the multi-threaded application such that the debug output of each of the one or more threads remains distinct from the debug output of the other threads.

3. The thread-safe debugging system of claim 2, wherein the debug output of each of the one or more threads may be directed to an output target.

4. The thread-safe debugging system of claim 3, wherein the output target comprises a file.

5. The thread-safe debugging system of claim 3, wherein the output target comprises a standard output terminal.

6. The thread-safe debugging system of claim 3, wherein the output target comprises a recipient computer system coupled to the client computer system.

7. The thread-safe debugging system of claim 3, wherein the output target comprises a plurality of remote diagnostic tools.

8. The thread-safe debugging system of claim 2, wherein the thread-safe debug print function is operable to provide debug output in a plurality of regional or national languages.

9. The thread-safe debugging system of claim 1, wherein the remote control service is operable to switch the debug services on and off after initiation of the multi-threaded application.

10. The thread-safe debugging system of claim 1, wherein the debug service comprises one or more debug objects, wherein each of the one or more debug objects corresponds to a component of the multi-threaded application, wherein each of the one or more debug objects is operable to provide the debug services to the corresponding component of the multi-threaded application.

11. The thread-safe debugging system of claim 10, wherein the remote control service is operable to allow a remote source to switch the debug services on and off for each of the corresponding components of the multi-threaded application by referencing each of the corresponding debug objects by name.

12. The thread-safe debugging system of claim 10, wherein the remote control service is operable to allow a remote source to switch the debug services on and off for a set of the corresponding components of the multi-threaded application by specifying a pattern to select a set of the debug objects by name.

13. The thread-safe debugging system of claim 10, wherein the debug services comprise a service to list all the debug objects in the multi-threaded application.

14. The thread-safe debugging system of claim 10, wherein the debug services comprise a service to list a state of each debug object in the multi-threaded application.

15. The thread-safe debugging system of claim 1, wherein the debug services comprise a service to profile execution of the multi-threaded application.

16. The thread-safe debugging system of claim 1, wherein the debug services comprise a service to trace program execution through the multi-threaded application.

17. The thread-safe debugging system of claim 1, wherein the debug services comprise a service to collect run-time statistics on the execution of the multi-threaded application.

18. The thread-safe debugging system of claim 1, wherein the debug services comprise a service to log statistical information on the execution of the multi-threaded application.

19. The thread-safe debugging system of claim 1, wherein the debug services comprise a service to log performance information on the execution of the multi-threaded application.

20. The thread-safe debugging system of claim 1, wherein the external source comprises a third party application executing on a remote computer system, wherein the remote computer system is coupled to the client computer system over a network.

21. A thread-safe debugging method, comprising:
   initiating execution of a multi-threaded application on a client computer system, wherein the multi-threaded application is linked to a thread-safe debug service, and wherein the debug service is executable to provide debug services to debug the multi-threaded application;
   initiating one of the debug services from a remote source through a thread-safe remote control service executing on the client computer system after initiating execution of the multi-threaded application on the client computer system, wherein the remote control service comprises a network protocol interface which is operable to receive control requests from the remote source, wherein the remote source comprises a remote computer system external to the client computer system; and
   managing the one of the debug services from the remote source through the remote control service after initiating the debug service.

22. The thread-safe debugging method of claim 21, wherein the thread-safe debug service comprises a thread-safe debug print function which is operable independently of the remote control service, wherein the thread-safe debug print function is operable to provide debug output for one or more threads of the multi-threaded application such that the debug output of each of the one or more threads remains distinct from the debug output of the other threads.

23. The thread-safe debugging method of claim 22, wherein the debug output of each of the one or more threads may be directed to an output target.

24. The thread-safe debugging method of claim 23, wherein the output target comprises a file.

25. The thread-safe debugging method of claim 23, wherein the output target comprises a standard output terminal.

26. The thread-safe debugging method of claim 23, wherein the output target comprises a recipient computer system coupled to the client computer system.

27. The thread-safe debugging method of claim 23, wherein the output target comprises a plurality of remote diagnostic tools.

28. The thread-safe debugging method of claim 22, wherein the thread-safe debug print function is operable to provide debug output in a plurality of regional or national languages.

29. The thread-safe debugging method of claim 21, wherein the remote control service is operable to allow a remote source to switch the debug services on and off after initiation of the multi-threaded application.

30. The thread-safe debugging method of claim 21, wherein the debug service comprises one or more debug objects, wherein each of the one or more debug objects corresponds to a component of the multi-threaded application, wherein each of the one or more debug objects is operable to provide the debug services to the corresponding component of the multi-threaded application.

31. The thread-safe debugging method of claim 30, wherein the multi-threaded application is linked to a thread-safe debug service by embedding each of the one or more debug objects into the corresponding component of the multi-threaded application.

32. The thread-safe debugging method of claim 30, wherein the remote control service is operable to allow a remote source to switch the debug services on and off for each of the corresponding components of the multi-threaded application by referencing each of the corresponding debug objects by name.

33. The thread-safe debugging method of claim 30, wherein the remote control service is operable to allow a remote source to switch the debug services on and off for a set of the corresponding components of the multi-threaded application by specifying a pattern to select a set of the debug objects by name.

34. The thread-safe debugging method of claim 30, wherein the managing the one of the debug services comprises listing all the debug objects in the multi-threaded application.

35. The thread-safe debugging method of claim 30, wherein the managing the one of the debug services comprises listing a state of each debug object in the multi-threaded application.

36. The thread-safe debugging method of claim 21, wherein the managing the one of the debug services comprises profiling execution of the multi-threaded application.

37. The thread-safe debugging method of claim 21, wherein the managing the one of the debug services comprises tracing program execution through the multi-threaded application.

38. The thread-safe debugging method of claim 21, wherein the managing the one of the debug services comprises collecting run-time statistics on the execution of the multi-threaded application.

39. The thread-safe debugging method of claim 21, wherein the managing the one of the debug services comprises logging statistical information on the execution of the multi-threaded application.

40. The thread-safe debugging method of claim 21, wherein the managing the one of the debug services comprises logging performance information on the execution of the multi-threaded application.

41. The thread-safe debugging method of claim 21, wherein the external source comprises a third party application executing on a remote computer system, wherein the remote computer system is coupled to the client computer system over a network.

42. A storage medium comprising program instructions for thread-safe debugging, wherein the program instructions are computer-executable to perform:
   linking a thread-safe debug service to a multi-threaded application executable on a client computer system, wherein the thread-safe debug service comprises one or more debug services for debugging the multi-threaded application;
   initiating one of the debug services from a remote source through a thread-safe remote control service executing on a server computer system after initiation of the multi-threaded application, wherein the remote control service comprises a network protocol interface which is operable to receive control requests from the remote source, wherein the remote source comprises a remote computer system external to the client computer system; and
   managing the one of the debug services from the remote source through the remote control service after initiating the debug service.

43. The storage medium of claim 42, wherein the thread-safe debug service comprises a thread-safe debug print function which is operable independently of the remote control service, wherein the thread-safe debug print function is operable to provide debug output for one or more threads of the multi-threaded application such that the debug output of each of the one or more threads remains distinct from the debug output of the other threads.

44. The storage medium of claim 43, wherein the debug output of each of the one or more threads may be directed to an output target.

45. The storage medium of claim 44, wherein the output target comprises a file.

46. The storage medium of claim 44, wherein the output target comprises a standard output terminal.

47. The storage medium of claim 44, wherein the output target comprises a recipient computer system coupled to the client computer system.

48. The storage medium of claim 44, wherein the output target comprises a plurality of remote diagnostic tools.

49. The storage medium of claim 43, wherein the thread-safe debug print function is operable to provide debug output in a plurality of regional or national languages.

50. The storage medium of claim 42, wherein the remote control service is operable to allow a remote source to switch the debug services on and off after initiation of the multi-threaded application.

51. The storage medium of claim 42, wherein the debug service comprises one or more debug objects, wherein each of the one or more debug objects corresponds to a component of the multi-threaded application, wherein each of the one or more debug objects is operable to provide the debug services to the corresponding component of the multi-threaded application.

52. The storage medium of claim 51, wherein the remote control service is operable to allow a remote source to switch the debug services on and off for each of the corresponding components of the multi-threaded application by referencing each of the corresponding debug objects by name.

53. The storage medium of claim 51, wherein the remote control service is operable to allow a remote source to switch the debug services on and off for a set of the corresponding components of the multi-threaded application by specifying a pattern to select a set of the debug objects by name.

54. The storage medium of claim 51, wherein the managing the one of the debug services comprises listing all the debug objects in the multi-threaded application.

55. The storage medium of claim 51, wherein the managing the one of the debug services comprises listing a state of each debug object in the multi-threaded application.

56. The storage medium of claim 42, wherein the managing the one of the debug services comprises profiling execution of the multi-threaded application.

57. The storage medium of claim 42, wherein the managing the one of the debug services comprises tracing program execution through the multi-threaded application.

58. The storage medium of claim 42, wherein the managing the one of the debug services comprises collecting run-time statistics on the execution of the multi-threaded application.

59. The storage medium of claim 42, wherein the managing the one of the debug services comprises logging statistical information on the execution of the multi-threaded application.

60. The storage medium of claim 42, wherein the managing the one of the debug services comprises logging performance information on the execution of the multi-threaded application.

61. The storage medium of claim 42, wherein the external source comprises a third party application executing on a remote computer system, wherein the remote computer system is coupled to the client computer system over a network.

\* \* \* \* \*